United States Patent
Yamaguchi

(10) Patent No.: US 12,074,501 B2
(45) Date of Patent: Aug. 27, 2024

(54) MOTOR-SPECIFIC ELECTROMAGNETIC BRAKING DEVICE

(71) Applicant: SANYO DENKI CO., LTD., Tokyo (JP)

(72) Inventor: Masahiro Yamaguchi, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 145 days.

(21) Appl. No.: 17/870,482

(22) Filed: Jul. 21, 2022

(65) Prior Publication Data

US 2023/0036610 A1 Feb. 2, 2023

(30) Foreign Application Priority Data

Jul. 28, 2021 (JP) .................................. 2021-123664

(51) Int. Cl.
  *F16D 59/02* (2006.01)
  *B60T 13/74* (2006.01)
  *H02K 7/102* (2006.01)

(52) U.S. Cl.
  CPC .......... *H02K 7/1023* (2013.01); *B60T 13/748* (2013.01)

(58) Field of Classification Search
  CPC ... B60T 13/748; H02K 7/1023; F16D 65/127; F16D 59/02; F16D 65/123; F16D 2065/1396; F16D 2065/1364
  USPC ......................................................... 318/372
  See application file for complete search history.

(56) References Cited

U.S. PATENT DOCUMENTS

| | | | | |
|---|---|---|---|---|
| 4,159,445 A | * | 6/1979 | Lee | ......................... G05B 11/10 318/673 |
| 2012/0146438 A1 | * | 6/2012 | Ide | ....................... H02K 7/1023 188/72.3 |
| 2014/0216867 A1 | * | 8/2014 | Yasuda | .................... F16D 55/28 188/163 |
| 2017/0210433 A1 | * | 7/2017 | Radenbaugh | ........... F16D 59/02 |
| 2019/0348890 A1 | * | 11/2019 | Shim | ........................ H02K 5/24 |
| 2020/0166090 A1 | * | 5/2020 | Lin | ........................... B66D 5/30 |

FOREIGN PATENT DOCUMENTS

| | | |
|---|---|---|
| CN | 209481096 | 10/2019 |
| EP | 1832778 | 9/2007 |
| JP | 2007-252111 A | 9/2007 |

OTHER PUBLICATIONS

Extended European Search Report (EESR) issued on Jan. 18, 2023 for the corresponding European Patent Application No. 22185459.9.

* cited by examiner

*Primary Examiner* — Gabriel Agared
(74) *Attorney, Agent, or Firm* — RANKIN, HILL & CLARK LLP

(57) ABSTRACT

A motor-specific electromagnetic braking device includes: a housing configured to rotatably house a rotating shaft portion of a motor; a hub attached to an outer perimeter of the rotating shaft portion; and a friction member configured to be rotatable together with the hub and movable in a direction of a rotation axis, and the friction member includes: a plate-shaped portion; and a friction portion provided to an outer-diameter portion of the plate-shaped portion, the hub is provided, on both sides in the direction of the rotation axis, with a pair of holding plates covering at least a part of the friction member, and inner-diameter portions of the pair of holding plates are fixed to the hub.

9 Claims, 6 Drawing Sheets

MOTOR-SPECIFIC ELECTROMAGNETIC BRAKING DEVICE

CROSS-REFERENCE TO RELATED APPLICATION

This application is based on Japanese Patent Application No. 2021-123664 filed with the Japan Patent Office on Jul. 28, 2021, the entire content of which is hereby incorporated by reference.

BACKGROUND

1. Technical Field

One aspect of the present disclosure relates to a motor-specific electromagnetic braking device.

2. Related Art

There are known: the power-off electromagnetic brake that performs braking with the force of a spring when no power is applied to the brake; and the power-on electromagnetic brake that performs braking with the electromagnetic force of an electromagnet when power is applied. In the power-off electromagnetic brake and the power-on electromagnetic brake, a friction disc is attached in such a manner as to be movable in a rotation axis direction. Hence, the friction disc is pressed against a plate under own weight of the friction disc when the brake is not actuated so that idling wear is caused on the friction disc and the plate. A braking device that restrains idling wear is disclosed in, for example, JP-A-2007-252111.

SUMMARY

A motor-specific electromagnetic braking device includes: a housing configured to rotatably house a rotating shaft portion of a motor; a hub attached to an outer perimeter of the rotating shaft portion; and a friction member configured to be rotatable together with the hub and movable in a direction of a rotation axis. The friction member includes: a plate-shaped portion; and a friction portion provided to an outer-diameter portion of the plate-shaped portion. The hub is provided, on both sides in the direction of the rotation axis, with a pair of holding plates covering at least a part of the friction member, and inner-diameter portions of the pair of holding plates are fixed to the hub.

DETAILED DESCRIPTION

Figure 1:
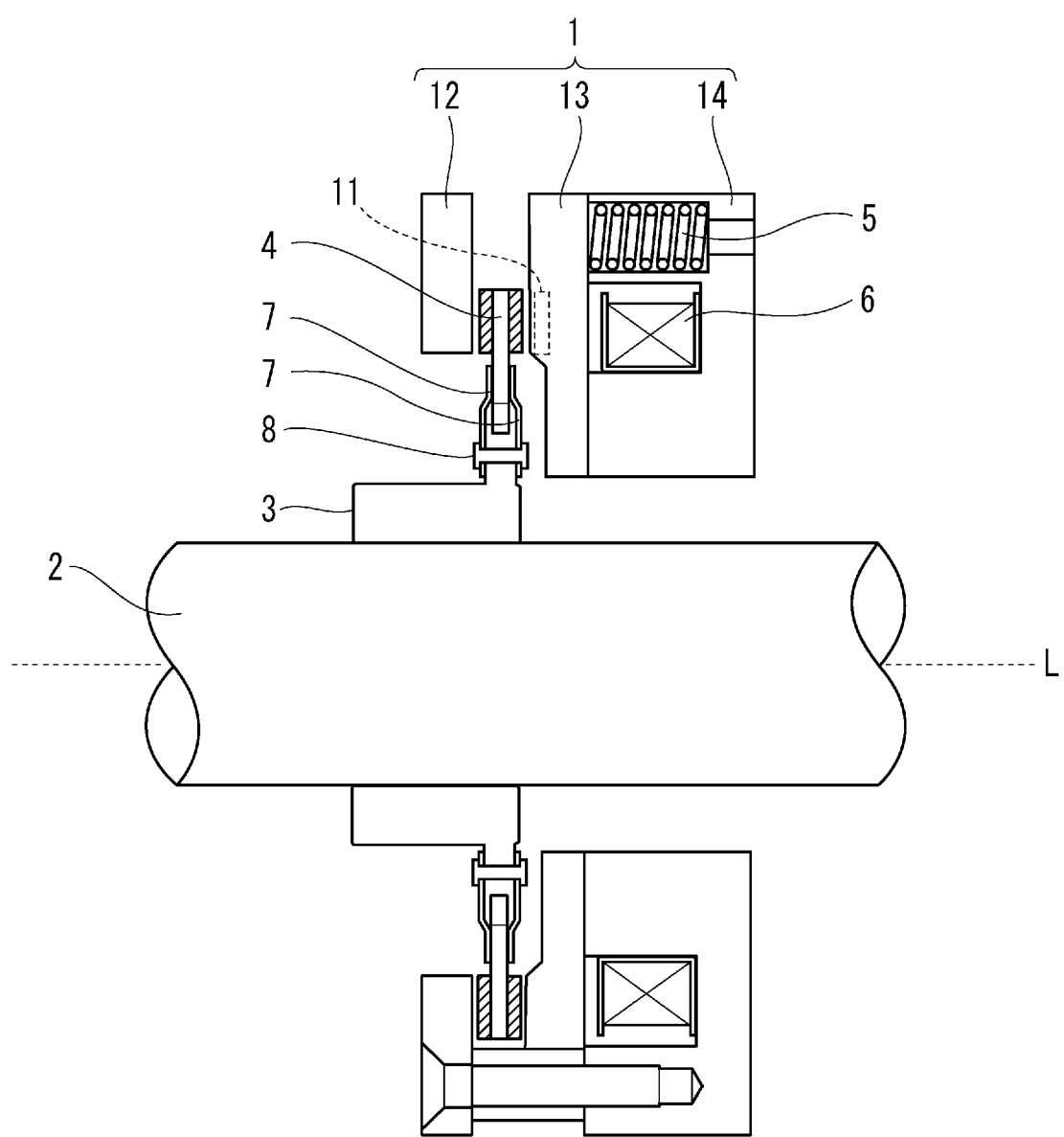
FIG. 1 illustrates a brake unactuated state of a motor-specific electromagnetic braking device according to the embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the braking device according to JP-A-2007-252111, a support spring holds a friction disc to restrain idling wear when the brake is not actuated. However, the support spring is in line contact with the friction disc. Hence, the vibration of the friction disc may be generated during the rotation operation, and rotation may not be stable.

Hence, one object of the present disclosure is to provide a motor-specific electromagnetic braking device where idling wear is not caused when the brake is not actuated.

A motor-specific electromagnetic braking device according to one aspect of the present disclosure (the present motor-specific electromagnetic braking device) includes: a housing configured to rotatably house a rotating shaft portion of a motor; a hub attached to an outer perimeter of the rotating shaft portion; and a friction member configured to be rotatable together with the hub and movable in a direction of a rotation axis. The friction member has a plate-shaped portion, and a friction portion provided to an outer-diameter portion of the plate-shaped portion. The hub is provided, on both sides in the direction of the rotation axis, with a pair of holding plates covering at least a part of the friction member. Inner-diameter portions of the pair of holding plates are fixed to the hub.

According to the present motor-specific electromagnetic braking device, the holding plates are fixed to the hub with a rivet. Furthermore, the holding plates hold the friction member from both sides of the friction member. Consequently, the position in the direction of the rotation axis is maintained. Hence, it is possible to restrain idling wear on the friction member and a plate, the idling wear being caused by the friction member being pressed against the plate under own weight of the friction member when the brake is not actuated.

The embodiment is described hereinafter with reference to the drawings. Descriptions of members having the same reference numerals as members already described in the detailed description are omitted for the convenience of description. Moreover, the dimensions of each member illustrated in the drawings may be different from actual dimensions thereof for the convenience of description.

FIG. 1 illustrates a brake unactuated state of a motor-specific electromagnetic braking device according to the embodiment. As illustrated in FIG. 1, the motor-specific electromagnetic braking device includes a rotating shaft portion 2 that rotates about a rotation axis L, a hub 3, a friction member 4, an elastic member 5, an electromagnet 6, holding plates 7, and a housing 1.

An unillustrated motor rotates the rotating shaft portion 2 about the rotation axis L. The rotating shaft portion 2 is connected to an output shaft of the motor. The rotating shaft portion 2 is supported by an unillustrated bearing in such a manner as to be rotatable relative to the housing 1. In other words, the housing 1 houses the rotating shaft portion 2 of the motor rotatably.

The hub 3 is attached to the outer perimeter of the rotating shaft portion 2. The hub 3 includes a cylindrical main body portion 32, and a flange portion 31 that expands outward from the main body portion 32. For example, a spline groove or key groove is provided on each of an inner peripheral surface of the main body portion 32 and an outer peripheral surface of the rotating shaft portion 2. Consequently, this makes the rotating shaft portion 2 and the hub 3 difficult to rotate relative to each other. Alternatively, it may be configured in such a manner that the rotating shaft portion 2 and the hub 3 resist rotation relative to each other simply by press-fitting the rotating shaft portion 2 in the hub 3.

Figure 2:
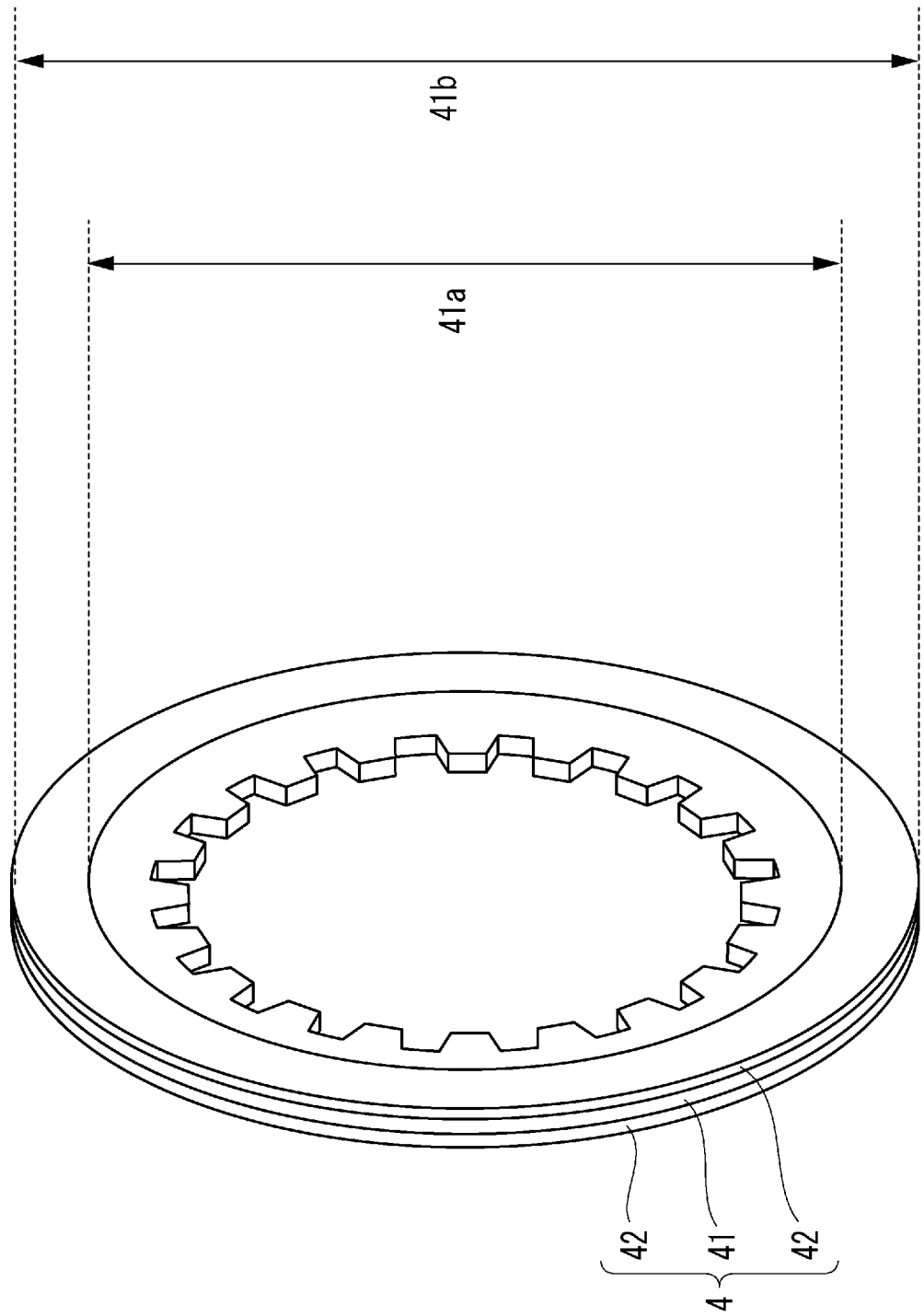
FIG. 2 is a perspective view of a friction member.

FIG. 2 is a perspective view of the friction member 4. The friction member 4 is a flat ring-shaped member, through the center of which the rotating shaft portion 2 and the hub 3 are inserted. The friction member 4 includes a plate-shaped portion 41 and a pair of friction portions 42. Each of the friction portions 42 is a brake shoe, and is a member having a high coefficient of friction. The pair of friction portions 42 are attached to one side and the other side of the plate-shaped portion 41 in a direction of the rotation axis L, respectively. A direction orthogonal to the direction of the rotation axis L is referred to as the radial direction. Assuming that the plate-shaped portion 41 is divided into two parts in the radial direction in any given proportion, the inner part is referred to as the inner-diameter portion, whereas the outer part is referred to as the outer-diameter portion. The friction portions 42 are provided to the outer-diameter portion of the plate-shaped portion 41.

Figure 3:
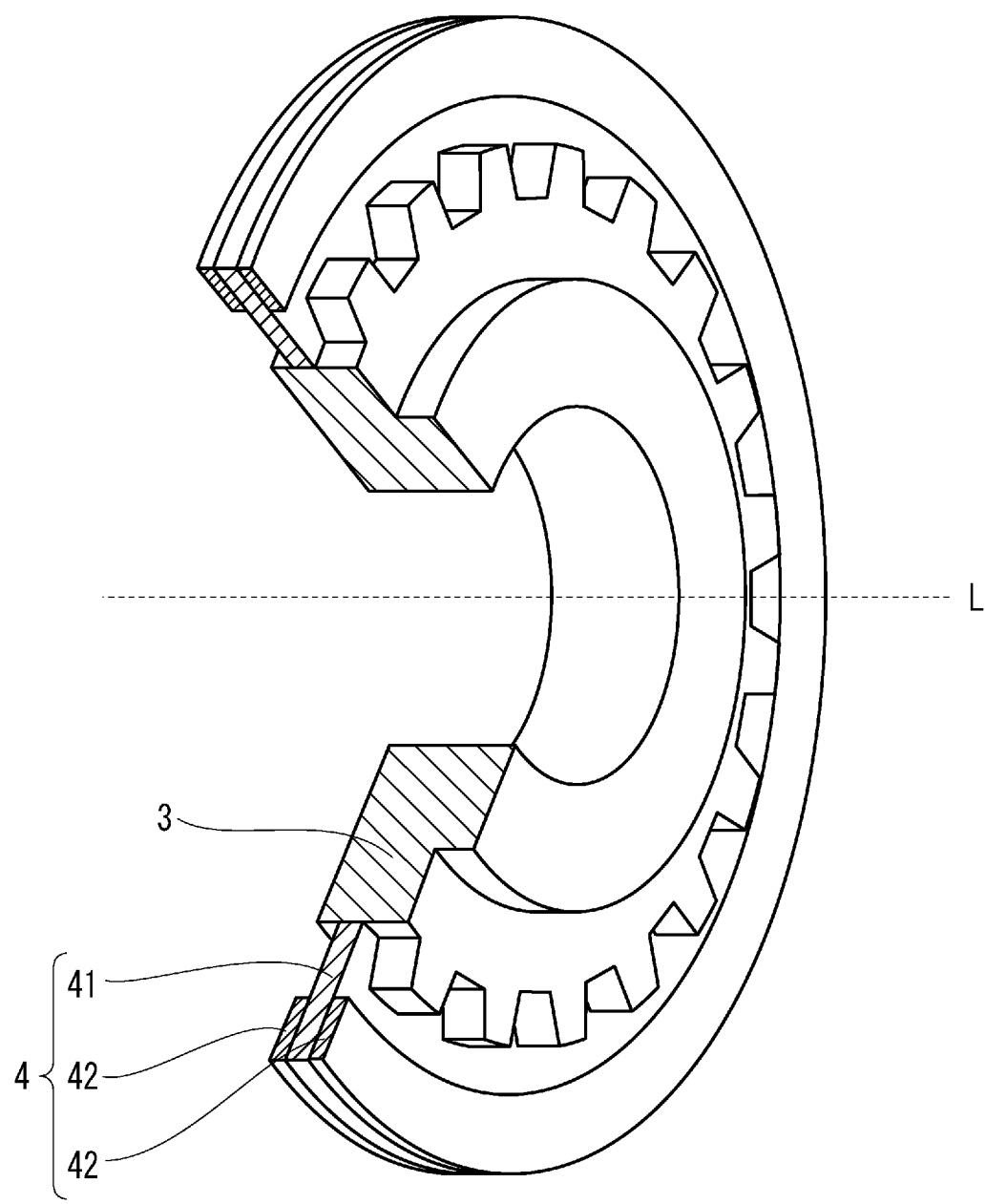
FIG. 3 is a perspective view illustrating a partial cross-section of a hub and the friction member assembled to the hub.

FIG. 3 is a perspective view illustrating the hub 3, and the friction member 4 assembled to the hub 3. FIG. 3 illustrates the hub 3 and the friction member 4 that are partially cut out for the convenience of description. As illustrated in FIG. 3, an outer peripheral surface of the flange portion 31 of the hub 3 is provided with a spline groove. An inner peripheral surface of the plate-shaped portion 41 of the friction member 4 is also provided with a spline groove of a shape that fits the flange portion 31. The spline groove is provided on the inner-diameter portion of the plate-shaped portion of the friction member 4, and does not reach the outer-diameter portion. In other words, the bottom of the spline groove does not reach the friction portions 42 of the friction member 4 in the radial direction.

The friction member 4 is spline-engaged with the hub 3 in such a manner that the spline grooves engage with each other. Hence, the friction member 4 does not rotate about the rotation axis L relative to the hub 3, and can move in the direction of the rotation axis L. In other words, the friction member 4 can rotate together with the hub 3.

Figure 4:
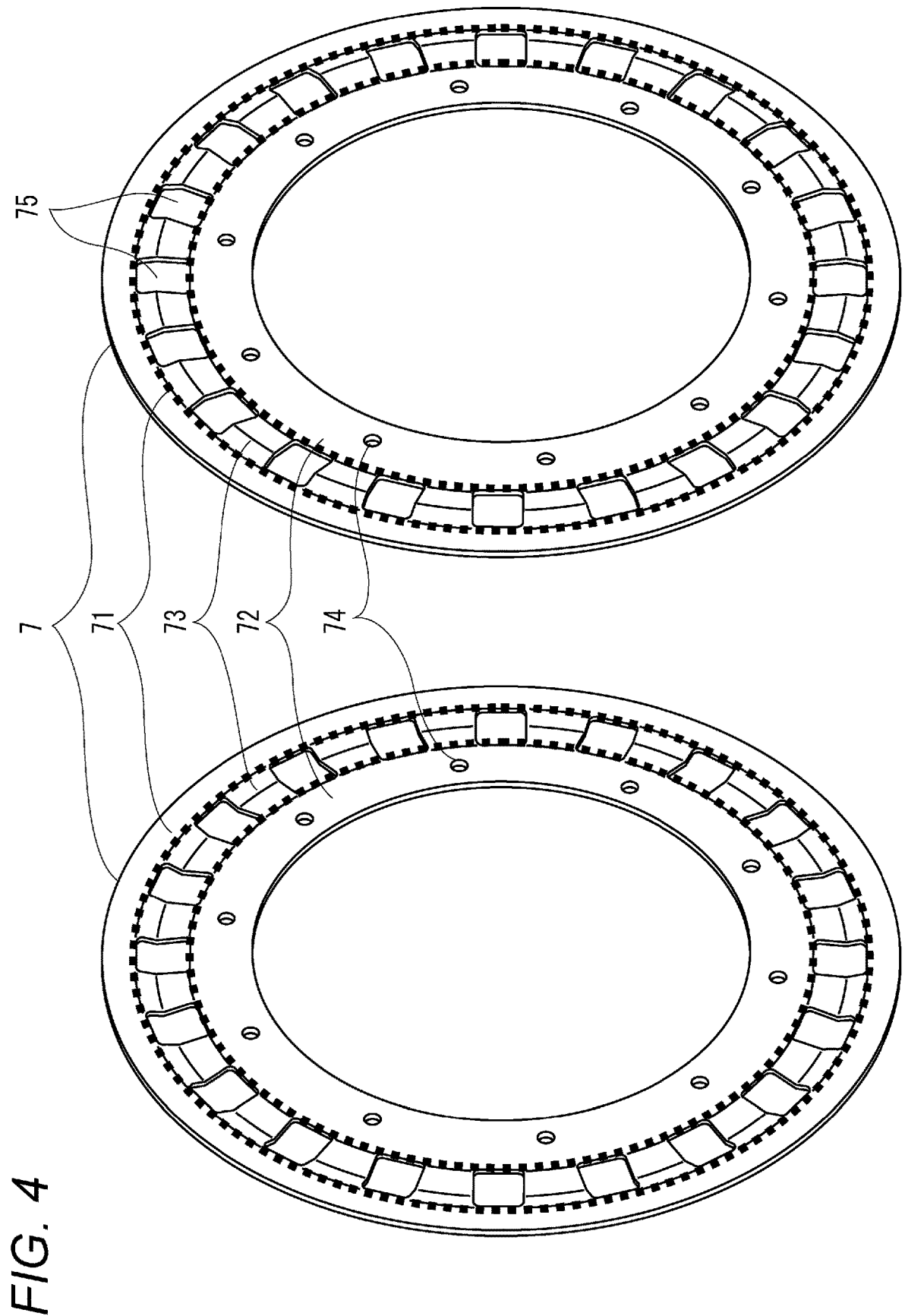
FIG. 4 is a perspective view of a pair of holding plates.

As illustrated in FIG. 1, the pair of holding plates 7 is provided on both sides of the hub 3 in the direction of the rotation axis L in such a manner as to cover at least a part of the friction member 4. FIG. 4 is a perspective view of the pair of holding plates 7. Each of the holding plates 7 is a saucer-shaped member without a bottom. The holding plates 7 are each provided, at the center, with a hole where the rotating shaft portion 2 and the hub 3 are inserted. The pair of holding plates 7 each include an inner-diameter portion 72, an outer-diameter portion 71, and an elastically deforming portion 73. The position of the inner-diameter portion 72 in the direction of the rotation axis L is different from the position of the outer-diameter portion 71 in the direction of the rotation axis L. Hence, the elastically deforming portion 73 connects the inner-diameter portion 72 and the outer-diameter portion 71 in the radial direction and also in the direction of the rotation axis L. Moreover, the elastically deforming portion 73 is provided with a plurality of hole portions 75 penetrating in the direction of the rotation axis L. The hole portions 75 are arranged along the circumferential direction, spaced at regular intervals. The hole portions 75 make the elastically deforming portion 73 more elastically deformable than the other parts.

Each of the pair of holding plates 7 may be a metal disc from which an inner part thereof is cut out in a shape of a circle.

The inner-diameter portion 72 of each of the holding plates 7 is provided with a plurality of rivet insertion holes 74 penetrating in the direction of the rotation axis L. The rivet insertion holes 74 are arranged along the circumferential direction, spaced at regular intervals. Rivets 8 are inserted into the rivet insertion holes 74 to fix the inner-diameter portions 72 of the pair of holding plates 7 to the flange portion 31 of the hub 3. In other words, the inner-diameter portions 72 of the pair of holding plates 7 are fixed to the hub 3 with the rivets 8.

Figure 5:
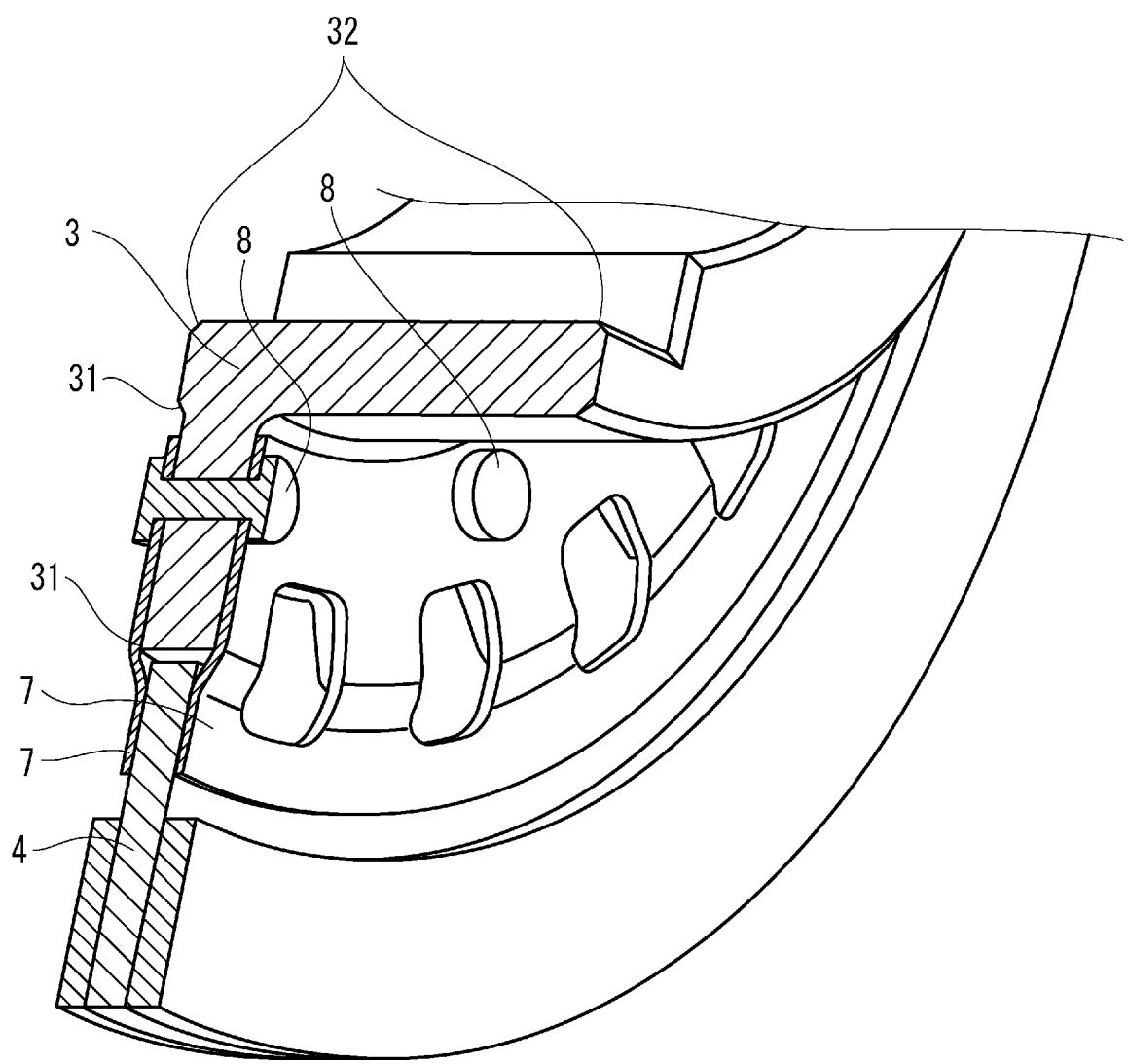
FIG. 5 illustrates a cross-section of the hub and the friction member assembled to the hub.

FIG. 5 illustrates a cross-section of the hub 3 and the friction member 4 assembled to the hub 3. As illustrated in FIG. 5, the friction member 4 is sandwiched between the pair of holding plates 7 in the direction of the rotation axis L and held by the holding plates 7. The inner-diameter portions 72 of the pair of holding plates 7 are fixed to one side and the other side of the flange portion 31 of the hub 3 in the direction of the rotation axis L, respectively. The rivets 8 are inserted through the inner-diameter portions 72 of the pair of holding plates 7 and the flange portion 31 with the flange portion 31 sandwiched between the inner-diameter portions 72. The rivets 8 are inserted into the rivet insertion holes 74 of the inner-diameter portions 72 of the holding plates 7. The inner-diameter portion of the friction member 4 is sandwiched between the outer-diameter portions 71 of the pair of holding plates 7 in the direction of the rotation axis L.

As illustrated graphically, the friction member 4 may be sandwiched between the inner-diameter portions 72 all around. Alternatively, the inner-diameter portions 72 may be each configured in such a manner as to be provided with a cutout or hole and to be partially in contact with the friction member 4.

When a force that displaces the friction member 4 relative to the hub 3 in the direction of the rotation axis L acts on the friction member 4, the elastically deforming portions 73 of the holding plates 7 deform. As a result, the friction member 4 is allowed to be displaced relative to the hub 3 in the direction of the rotation axis L. As described by use of FIG. 3, it is difficult for the friction member 4 to rotate about the rotation axis L relative to the hub 3.

Return to FIG. 1. The housing 1 includes a side plate 12, an armature 13, and a yoke 14. The friction member 4 is located between the side plate 12 and the armature 13 in the direction of the rotation axis L. The armature 13 can be displaced relative to the yoke 14 in the direction of the rotation axis L. The elastic member 5 exerts, on the armature 13, an elastic restoring force in a direction where the armature 13 moves away from the yoke 14.

The electromagnet 6 is fixed to the yoke 14. When the electromagnet 6 is energized, an electromagnetic force is generated in a direction where the armature 13 is attracted to the yoke 14. In the brake unactuated state illustrated in FIG. 1, the electromagnet 6 is being energized, and the armature 13 has been attracted to the yoke 14 against the elastically restoring force of the elastic member 5. Hence, the friction member 4 is not in contact with the armature 13 and the side plate 12, and a braking force is not generated.

Figure 6:
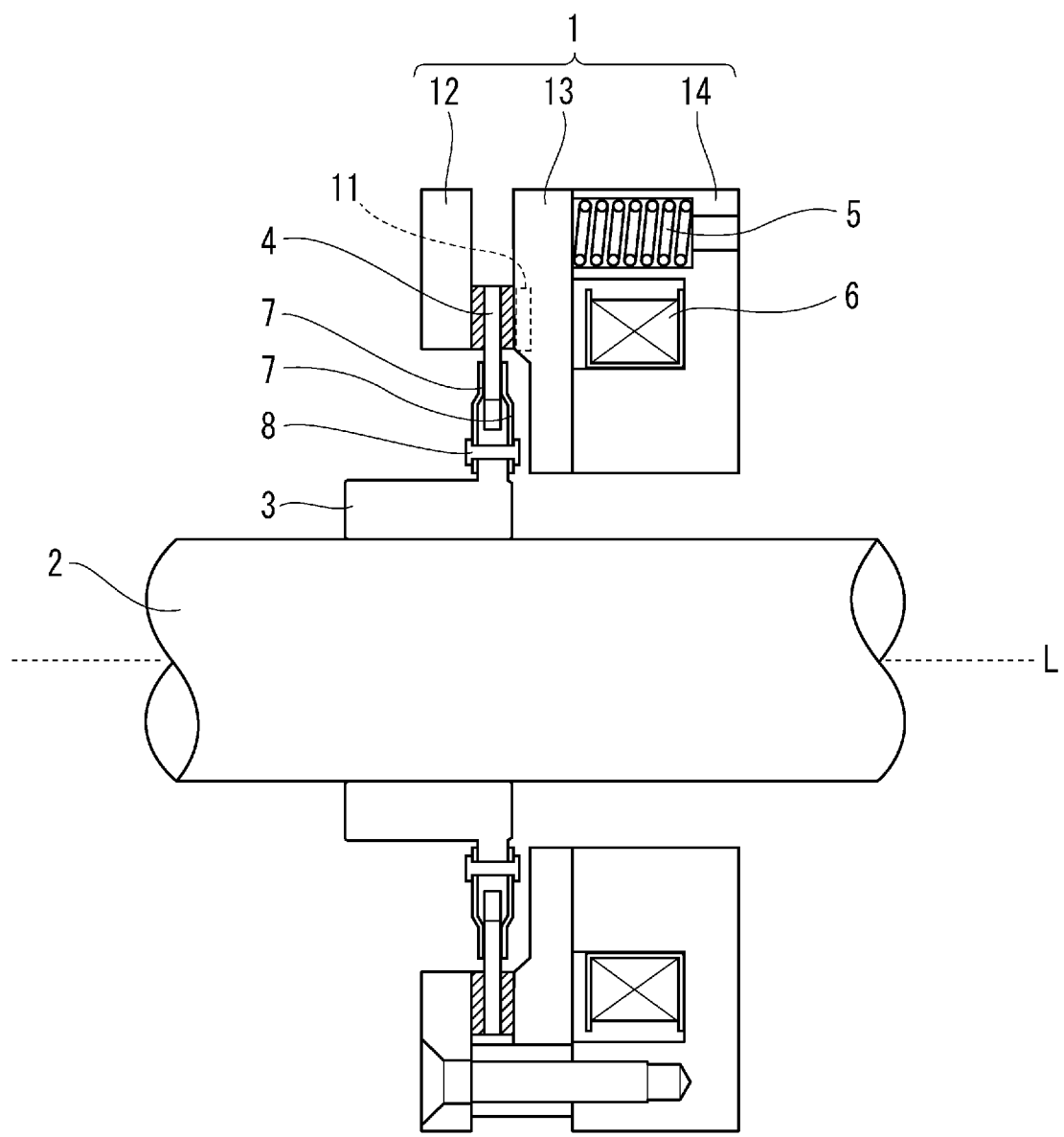
FIG. 6 illustrates a brake actuated state of the motor-specific electromagnetic braking device according to the embodiment.

FIG. 6 illustrates a brake actuated state of the motor-specific electromagnetic braking device. As illustrated in FIG. 6, in a non-energized state where the electromagnet 6 is not energized, the elastic restoring force of the elastic member 5 moves the armature 13 in the direction away from the yoke 14. The friction portions 42 of the friction member 4 are squeezed between the side plate 12 and the armature 13, and then the braking force is generated. In other words, the elastic member brings the friction member 4 into contact with the side plate 12 and the armature 13 (a contact portion) of the housing 1.

At this point in time, the armature 13 presses the friction portions 42 to the side plate 12 in the direction of the rotation axis L. The elastically deforming portions 73 of the holding plates 7 deform to allow the displacement of the outer-diameter portions 71, which support the friction portions 42, of the holding plates 7 to the side plate 12 relative to the inner-diameter portions 72 in the direction of the rotation axis L.

When the electromagnet 6 is energized again from the state illustrated in FIG. 6 into the state illustrated in FIG. 1, the elastic restoring force of the elastic member 5 stops acting on the armature 13. The elastically deforming portions 73 of the holding plates 7 return to their original shape under their own elastic restoring forces, and then hold the friction member 4 at the position away from the side plate 12 and the armature 13.

In this manner, the elastic member 5 brings the friction member 4 and the armature 13 of the housing 1 into contact with each other, or separates the friction member 4 and the armature 13 from each other. Moreover, the electromagnet 6 separates the friction member 4 and the armature 13 from each other when the elastic member 5 brings the friction member 4 and the armature 13 into contact with each other, whereas the electromagnet 6 brings the friction member 4 and the armature 13 into contact with each other when the elastic member 5 separates the friction member 4 and the armature 13 from each other.

As described above, in the motor-specific electromagnetic braking device of the embodiment, the inner-diameter portions 72 of the pair of holding plates 7 are fixed to the flange portion 31 with the rivets 8. The outer-diameter portions 71 of the pair of holding plates 7 are in surface contact with the friction member 4. The friction member 4 is sandwiched between the outer-diameter portions 71. The holding plates 7 deform elastically to support the friction member 4 in such a manner that the friction member 4 can move relative to the hub 3 in the direction of the rotation axis L. Hence, the holding plates 7 allow the friction member 4 to move to the position that contacts the contact portion (the side plate 12 and the armature 13) when the brake is actuated. On the other hand, the holding plates 7 can hold the friction member 4 stably at the position away from the contact portion when the brake is not actuated.

Consequently, as in JP-A-2007-252111, it is possible to restrain idling wear on the friction member and the side plate during rotation of the motor, the idling wear being caused by the friction member being pressed against the side plate under the own weight of the friction member when the brake is not actuated.

Moreover, in, for example, JP-A-2007-252111, the support spring is in line contact with the friction member. In contrast, according to the motor braking device of the embodiment, the outer-diameter portions 71 of the pair of holding plates 7 are in surface contact with the friction member 4, and the friction member 4 is sandwiched between the outer-diameter portions 71. Hence, the vibration of the friction member 4 that is caused when the brake is not actuated is reduced. Therefore, the rotating shaft portion 2 can be stably rotated. From the viewpoint of the stability of rotation of the rotating shaft portion 2, the diameter of the holding plate 7 is desirably equal to or greater than 80% of an inner diameter 41a of the friction member 4, or equal to or greater than 65% of an outer diameter 41b of the friction member 4.

Moreover, when the inner-diameter portions 72 of the pair of holding plates 7 are fixed to the flange portion 31 of the hub 3, the elastically deforming portions 73 deform elastically. Furthermore, the outer-diameter portions 71 of the pair of holding plates 7 are provided along the friction member 4, and have the structure that is in surface contact with the friction member 4 and sandwiches the friction member 4 between the outer-diameter portions 71. Hence, it is possible to fix the friction member 4 in the direction of the rotation axis L with a small force while securing the area required by the pair of holding plates 7 to sandwich the friction member 4. Consequently, it is possible to reduce the vibration of the friction member 4 during the rotation operation of the motor and to improve the stability of rotation of the motor.

Furthermore, the plurality of rivet insertion holes 74 is evenly and concentrically distributed in the inner-diameter portions 72 of the pair of holding plates 7. Hence, the plurality of rivets 8 is also evenly and concentrically distributed. Hence, it is possible to fix the friction member 4 in the direction of the rotation axis L with a small force in such a manner as not to inhibit the torque of the brake at the time of the actuation of the brake. Consequently, it is possible to reduce the vibration of the friction member 4 during rotation of the motor and to improve the stability of rotation of the motor.

Moreover, each of the pair of holding plates 7 may include the inner-diameter portion 72, the outer-diameter portion 71, and the elastically deforming portion 73 that connects the inner-diameter portion 72 and the outer-diameter portion 71 in the direction of the rotation axis L.

According to the above configuration, it is possible to cause the elastically deforming portion 73 to control the deformation of the holding plate 7 that allows the displacement of the outer-diameter portion 71 and the inner-diameter portion 72 in the direction of the rotation axis L. In other words, the force to hold the position of the friction member 4 in the direction of the rotation axis L can be managed with the ease of bending of the elastically deforming portion 73. The force to hold the position of the friction member 4 in the direction of the rotation axis L varies depending on the application. According to the above configuration, it is easy to adjust the force in the design stage with the ease of bending of the elastically deforming portion 73 as an indicator.

Up to this point the embodiment of the present disclosure has been described. In terms of this, it is needless to say that the technical scope of the present disclosure should not be construed in a limited manner by the description of the embodiment. The embodiment is a mere example. Those skilled in the art understand that the embodiment can be modified in various manners within the technical scope of the present disclosure described in the claims. Specifically, the embodiment has been described, taking, as an example, a power-off electromagnetic brake that performs braking with the force of a spring when no power is applied to the brake. In terms of this, the electromagnetic brake according to the embodiment of the present disclosure may be a power-on electromagnetic brake that performs braking with the electromagnetic force of an electromagnet when power is applied. The technical scope of the present disclosure should be determined on the basis of the scope described in the claims and the scope of equivalents thereof.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A motor-specific electromagnetic braking device comprising:
    a housing configured to rotatably house a rotating shaft portion of a motor;
    a hub attached to an outer perimeter of the rotating shaft portion;
    a friction member configured to be rotatable together with the hub and movable in a direction of a rotation axis, wherein the friction member includes a plate-shaped portion, and a friction portion provided to an outer-diameter portion of the plate-shaped portion,
    the hub is provided, on both sides in the direction of the rotation axis, with a pair of holding plates covering at least a part of the friction member,
    inner-diameter portions of the pair of holding plates are fixed to the hub, and
    each of the holding plates has a saucer shape with a hole in the center through which the rotating shaft portion and the hub are inserted;
    an elastic member configured to bring the friction member and a contact portion of the housing into contact with each other and separate the friction member and the contact portion from each other; and
    an electromagnet,
    wherein the electromagnet separates the friction member and the contact portion from each other when the elastic member brings the friction member and the contact portion into contact with each other, whereas the electromagnet brings the friction member and the contact portion into contact with each other when the elastic member separates the friction member and the contact portion from each other.

2. The motor-specific electromagnetic braking device according to claim 1, wherein outer-diameter portions of the pair of holding plates are provided along the friction member.

3. The motor-specific electromagnetic braking device according to claim 1, wherein the inner-diameter portions of the pair of holding plates are fixed to the hub with a rivet.

4. The motor-specific electromagnetic braking device according to claim 1, wherein each of the pair of holding plates includes the inner-diameter portion, the outer-diameter portion, and an elastically deforming portion connecting the inner-diameter portion and the outer-diameter portion in the direction of the rotation axis.

5. The motor-specific electromagnetic braking device according to claim 4, wherein each of the elastically deforming portions is provided with a plurality of hole portions that are arranged along a circumferential direction, spaced at regular intervals.

6. The motor-specific electromagnetic braking device according to claim 1, wherein the friction member is sandwiched between the inner-diameter portions of the pair of holding plates all around.

7. The motor-specific electromagnetic braking device according to claim 1, wherein each of the pair of holding plates has a diameter equal to or greater than 80% of an inner diameter of the friction member, or a diameter equal to or greater than 65% of an outer diameter of the friction member.

8. The motor-specific electromagnetic braking device according to claim 3, wherein
    the rivet comprises a plurality of rivets, and
    the plurality of rivets is evenly and concentrically distributed.

9. The motor-specific electromagnetic braking device according to claim 1, wherein each of the pair of holding plates is a metal disc from which an inner part thereof is cut out in a shape of a circle.

* * * * *